United States Patent
Zhamu et al.

(10) Patent No.: US 11,021,371 B2
(45) Date of Patent: *Jun. 1, 2021

(54) HOLLOW GRAPHENE BALLS AND DEVICES CONTAINING SAME

(71) Applicant: Global Graphene Group, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/044,901

(22) Filed: Jul. 25, 2018

(65) Prior Publication Data

US 2020/0031677 A1    Jan. 30, 2020

(51) Int. Cl.
*C01B 32/20* (2017.01)
*C09K 5/14* (2006.01)
*B01J 20/28* (2006.01)

(52) U.S. Cl.
CPC ......... *C01B 32/20* (2017.08); *B01J 20/28045* (2013.01); *C09K 5/14* (2013.01)

(58) Field of Classification Search
CPC ...................................... C01B 32/20
See application file for complete search history.

(56) References Cited

U.S. PATENT DOCUMENTS

| | | | |
|---|---|---|---|
| 6,872,330 B2 | 3/2005 | Mack et al. | |
| 7,071,258 B1 | 7/2006 | Jang et al. | |
| 7,327,000 B2 | 2/2008 | DeHeer et al. | |
| 9,597,657 B1 | 3/2017 | Zhamu et al. | |
| 2005/0271574 A1 | 12/2005 | Jang et al. | |
| 2008/0048152 A1 | 2/2008 | Jang et al. | |
| 2015/0284253 A1 | 10/2015 | Zhamu et al. | |
| 2016/0204420 A1 | 7/2016 | Toulis et al. | |
| 2017/0158513 A1 | 6/2017 | Zhamu et al. | |
| 2017/0166722 A1 | 6/2017 | Zhamu et al. | |
| 2017/0182474 A1* | 6/2017 | Zhamu | C02F 1/681 |
| 2017/0194105 A1 | 7/2017 | Zhamu et al. | |
| 2017/0225233 A1 | 8/2017 | Zhamu et al. | |
| 2017/0338472 A1 | 11/2017 | Zhamu et al. | |
| 2017/0352868 A1 | 12/2017 | Zhamu et al. | |

FOREIGN PATENT DOCUMENTS

| | | |
|---|---|---|
| CN | 106379885 A | 2/2017 |
| KR | 1020170081299 A | 7/2017 |

OTHER PUBLICATIONS

Hummers, "Preparation of graphitic oxide" J. Am. Chem. Soc. (1958) vol. 80, p. 1339.

(Continued)

*Primary Examiner* — William D Young

(57) ABSTRACT

Provided is a powder mass of multiple individual hollow graphene balls, wherein at least one of the hollow graphene balls has a graphene shell composed of graphene sheets bonded by a carbon material and a hollow core enclosed by the graphene shell. These hollow graphene sheets can be used in a broad array of applications, such as for thermal management, for separating an organic solvent from a solvent-water mixture, and for separating oil from water.

10 Claims, 9 Drawing Sheets

(56) References Cited

OTHER PUBLICATIONS

Jang et al., "Processing of Nano Graphene Platelets (NGPs) and NGP Nanocomposites: A Review" J. Materials Sci. (2008) vol. 43, pp. 5092-5101.
Yang et al., "Two-dimensional Graphene Nano-ribbons" J. Am. Chem. Soc. (2008) vol. 130, pp. 4216-4217.
PCT/US19/43148 International Search Report and Written Opinion dated Nov. 8, 2019, 12 pages.
U.S. Appl. No. 16/044,878 Nonfinal Office Action dated Jan. 10, 2020, 9 pages.

\* cited by examiner

HOLLOW GRAPHENE BALLS AND DEVICES CONTAINING SAME

FIELD OF THE INVENTION

The present invention relates generally to the field of graphene and, more particularly, to hollow graphene balls and a process for producing same.

BACKGROUND OF THE INVENTION

Carbon is known to have five unique crystalline structures, including diamond, fullerene (0-D nanographitic material), carbon nanotube or carbon nanofiber (1-D nanographitic material), graphene (2-D nanographitic material), and graphite (3-D graphitic material). The carbon nanotube (CNT) refers to a tubular structure grown with a single wall or multi-wall. Carbon nanotubes (CNTs) and carbon nanofibers (CNFs) have a diameter on the order of a few nanometers to a few hundred nanometers. Their longitudinal, hollow structures impart unique mechanical, electrical and chemical properties to the material. The CNT or CNF is essentially a one-dimensional nanocarbon or 1-D nanographite material.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 6, 2004) (U.S. Patent Pub. No. 2005/0271574); and (3) B. Z. Jang, A. Zhamu, and J. Guo, "Process for Producing Nano-scaled Platelets and Nanocomposites," U.S. patent application Ser. No. 11/509,424 (Aug. 25, 2006) (U.S. Patent Pub. No. 2008-0048152).

NGPs have been found to have a range of unusual physical, chemical, and mechanical properties. For instance, graphene was found to exhibit the highest intrinsic strength and highest thermal conductivity of all existing materials. Although practical electronic device applications for graphene (e.g., replacing Si as a backbone in a transistor) are not envisioned to occur within the next 5-10 years, its application as a nanofiller in a composite material and an electrode material in energy storage devices is imminent. The availability of processable graphene sheets in large quantities is essential to the success in exploiting composite, energy, and other applications for graphene.

As herein disclosed, we have combined the chemical-free production of graphene and the formation of a graphene-carbon hybrid form into one single operation.

For the purpose of defining the claims of the instant application, NGPs or graphene materials include discrete sheets/platelets of single-layer and multi-layer (typically less than 10 layers), pristine graphene, slightly oxidized graphene 5% by weight of oxygen), graphene oxide (≥5% by weight of oxygen), reduced graphene oxide (RGO), slightly fluorinated graphene (<5% by weight of fluorine), graphene fluoride (≥5% by weight of fluorine), other halogenated graphenes, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials. The presently invented graphene-carbon balls can contain pristine or non-pristine graphene and the invented method allows for this flexibility.

Although there have been several approaches developed for producing solid graphene foam structures that are composed of interconnected pores and graphene pore walls, this process enables mass production of isolated, separated hollow graphene balls, wherein a graphene ball comprises a graphene-based shell and a hollow core. Such a shell-hollow core structure can be used for many practical applications; e.g. to accommodate lithium metal in a lithium battery.

Thus, it is an object of the present invention to provide a cost-effective process for producing highly conductive, mechanically robust graphene balls in large quantities. This process does not involve the use of an environmentally unfriendly chemical. This process enables the flexible design and control of the porosity level and pore sizes.

Another object of the present invention is to provide products (e.g. devices) that contain hollow graphene balls of the present invention and methods of operating these products.

SUMMARY OF THE INVENTION

The present invention provides a method of producing multiple individual hollow graphene balls directly from a graphitic material and particles of a polymer. This method is stunningly simple. The method comprises:
(a) mixing multiple particles of a graphitic material and multiple particles of a solid polymer carrier material to form a mixture in an impacting chamber of an energy impacting apparatus;
(b) operating this energy impacting apparatus with a frequency and an intensity for a length of time sufficient for peeling off graphene sheets from the graphitic material and transferring the graphene sheets to surfaces of the solid polymer carrier material particles to produce graphene-encapsulated polymer particles inside the impacting chamber; (e.g. The impacting apparatus, when in operation, imparts kinetic energy to polymer particles, which in turn impinge upon graphite particle surfaces/edges and peel off graphene sheets from the impacted graphite particles. These peeled-off graphene sheets stick to surfaces of these polymer particles. This is herein referred to as the "direct transfer" process, meaning that graphene sheets are directly transferred from graphite particles to surfaces of polymer particles without being mediated by any third-party entity.)
(c) recovering the graphene-encapsulated polymer particles from the impacting chamber; and
(d) suspending the graphene-encapsulated polymer particles in a gaseous medium to keep the particles separated from each other while concurrently pyrolyzing the particles to thermally convert the polymer into pores and carbon, wherein at least one of the graphene balls comprises a hollow core enclosed by a shell composed of graphene sheets bonded together by the carbon produced from the polymer.

In some embodiments, step (d) of suspending the graphene-encapsulated polymer particles in a gaseous medium comprises operating a fluidized-bed apparatus. This step is essential to preventing multiple graphene balls being stuck together.

In certain embodiments, a plurality of impacting balls or media are added to the impacting chamber of the energy impacting apparatus. These impacting balls, accelerated by the impacting apparatus, impact the surfaces/edges of graphite particles and peel off graphene sheets therefrom. These graphene sheets are tentatively transferred to surfaces of these impacting balls. These graphene-supporting impacting balls subsequently impinge upon polymer particles and transfer the supported graphene sheets to the surfaces of these polymer particles. This sequence of events is herein referred to as the "indirect transfer" process. In some embodiments of the indirect transfer process, step (c) includes operating a magnet to separate the impacting balls or media from the graphene-coated or graphene-embedded polymer particles.

The solid polymer material particles can include plastic or rubber beads, pellets, spheres, wires, fibers, filaments, discs, ribbons, or rods, having a diameter or thickness from 10 nm to 10 mm. Preferably, the diameter or thickness is from 100 nm to 1 mm, and more preferably from 200 nm to 200 μm. The solid polymer may be selected from solid particles of a thermoplastic, thermoset resin, rubber, semi-penetrating network polymer, penetrating network polymer, natural polymer, or a combination thereof. In an embodiment, the solid polymer is partially removed by melting, etching, or dissolving in a solvent prior to step (d).

In certain embodiments, the graphitic material is selected from natural graphite, synthetic graphite, highly oriented pyrolytic graphite, graphite fiber, graphitic nanofiber, graphite fluoride, oxidized graphite, chemically modified graphite, exfoliated graphite, recompressed exfoliated graphite, expanded graphite, mesocarbon microbead, or a combination thereof. Preferably, the graphitic material contains a non-intercalated and non-oxidized graphitic material that has never been previously exposed to a chemical or oxidation treatment prior to the mixing step (a).

We have surprisingly observed that a broad array of impacting devices can be used for practicing the instant invention. For instance, the energy impacting apparatus can be a vibratory ball mill, planetary ball mill, high energy mill, basket mill, agitator ball mill, cryo ball mill, micro ball mill, tumbler ball mill, continuous ball mill, stirred ball mill, pressurized ball mill, freezer mill, vibratory sieve, bead mill, nanobead mill, ultrasonic homogenizer mill, centrifugal planetary mixer, vacuum ball mill, or resonant acoustic mixer.

For the formation of the carbon component that bonds graphene sheets together to form the graphene ball shell, one can choose polymer particles that have a high carbon yield or char yield (e.g. >30% by weight). The carbon yield is the weight percentage of a polymer structure that is converted by heat to a solid carbon phase, instead of becoming part of a volatile gas. The high carbon-yield polymer may be selected from phenolic resin, poly furfuryl alcohol, polyacrylonitrile, polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, a copolymer thereof, a polymer blend thereof, or a combination thereof.

If a lower carbon content (higher graphene proportion) is desired in the graphene-carbon shell, the polymer can contain a low carbon-yield polymer selected from polyethylene, polypropylene, polybutylene, polyvinyl chloride, polycarbonate, acrylonitrile-butadiene (ABS), polyester, polyvinyl alcohol, poly vinylidene fluoride (PVDF), polytetrafluoroethylene (PTFE), polyphenylene oxide (PPO), poly methyl methacrylate (PMMA), a copolymer thereof, a polymer blend thereof, or a combination thereof.

It may be noted that these polymers (both high and low carbon yields), when heated at a temperature of 300-2,500° C., are converted into a carbon material, which is preferentially nucleated near graphene sheet edges. Such a carbon material serves to bridge the gaps between graphene sheets, forming interconnected electron-conducting pathways. When further heated at a temperature higher than 2,500° C., the graphene-bonding carbon phase can become graphitized provided that the carbon phase is "soft carbon" or graphitizable. In such a situation, both the electric conductivity and thermal conductivity are further increased.

Thus, in certain embodiments, the step of pyrolyzing includes carbonizing the polymer at a temperature from 200° C. to 2,500° C. to obtain carbon-bonded graphene sheets. Optionally, the carbon-bonded graphene sheets can be subsequently graphitized at a temperature from 2,500° C. to 3,200° C. to obtain graphite-bonded graphene sheets.

It may be noted that pyrolyzation of a polymer tends to lead to the formation of pores in the resulting polymeric carbon phase due to the evolution of those volatile gas molecules such as $CO_2$ and $H_2O$. However, such pores also have a high tendency to get collapsed if the polymer is not constrained when being carbonized. We have surprisingly discovered that the graphene sheets wrapped around a polymer particle are capable of constraining the carbon pore walls from being shrunk and collapsed, while some carbon species also permeate to the gaps between graphene sheets where these species bond the graphene sheets together. The pore sizes and pore volume (porosity level) of the resulting hollow graphene balls depend upon the starting polymer size and the carbon yield of the polymer and, to a lesser extent, on the pyrolyzation temperature.

The present invention also provides powder mass of multiple hollow graphene balls wherein at least one of the graphene balls has a hollow core enclosed by a graphene shell. The graphene shell contains single-layer or few-layer graphene sheets chemically bonded by a carbon material having a carbon material-to-graphene weight ratio from 1/200 to 1/2. The few-layer graphene sheets have 2-10 layers of stacked graphene planes having an inter-plane spacing $d_{002}$ from 0.3354 nm to 0.36 nm as measured by X-ray diffraction and the single-layer or few-layer graphene sheets contain a pristine graphene material having essentially zero % of non-carbon elements.

The hollow graphene ball typically has a density from 0.01 to 1.7 g/cm³, and a specific surface area from 50 to 3,000 m²/g. In a preferred embodiment, the graphene shell contains stacked graphene planes having an inter-planar spacing $d_{002}$ from 0.3354 nm to 0.40 nm as measured by X-ray diffraction. More typically, the graphene ball has a specific surface area from 200 to 2,000 m²/g or a density from 0.05 to 1.5 g/cm³.

Multiple graphene balls may be compacted into any desirable shape (e.g. by filling graphene balls into a mold cavity) and using a binder resin to bond the graphene balls together. The binder resin may then be thermally converted (e.g. carbonized) into a carbon material. Such an approach provides flexibility or versatility in making foam-like objects of practically any shape.

In some embodiments, the graphene shell comprises few-layer graphene sheets comprising 2-10 layers of stacked graphene planes having an inter-plane spacing $d_{002}$ from 0.3354 nm to 0.36 nm as measured by X-ray diffraction.

The invention also provides an oil-removing or oil-separating device containing the invented hollow graphene balls as an oil-absorbing element.

The invention further provides a solvent-removing or solvent-separating device containing the invented hollow graphene balls as a solvent-absorbing or solvent-separating element.

Also provided is a method to separate oil from water, the method comprising the steps of: (a) providing an oil-absorbing element comprising the invented hollow graphene balls; (b) contacting an oil-water mixture with the element, which absorbs the oil from the mixture; and (c) retreating the element from the mixture and extracting the oil from the element. The method may further comprise a step of reusing the element.

The present invention also provides a method for separating an organic solvent from a solvent-water mixture or from a multiple-solvent mixture, the method comprising the steps of: (a) providing an organic solvent-absorbing or solvent-separating element comprising the invented hollow graphene balls; (b) bringing the element in contact with an organic solvent-water mixture or a multiple-solvent mixture containing a first solvent and at least a second solvent; (c) allowing the element to absorb the organic solvent from the mixture or separate the first solvent from the at least second solvent; and (d) retreating the element from the mixture and extracting the organic solvent or first solvent from the element. The method may further comprise a step of reusing the element.

The invention also provides a thermal management device containing the invented hollow graphene balls as a heat-conducting, heat spreading or heat dissipating element. In some embodiments, the thermal management device contains a device selected from a heat exchanger, heat sink, heat pipe, high-conductivity insert, conductive plate between a heat sink and a heat source, heat-spreading component, heat-dissipating component, thermal interface medium, or thermoelectric or Peltier cooling device.

DESCRIPTION OF THE PREFERRED EMBODIMENTS

The present invention provides a method of producing individual (isolated or separated) hollow graphene balls directly from particles of a graphitic material and particles of a polymer.

Figure 1:
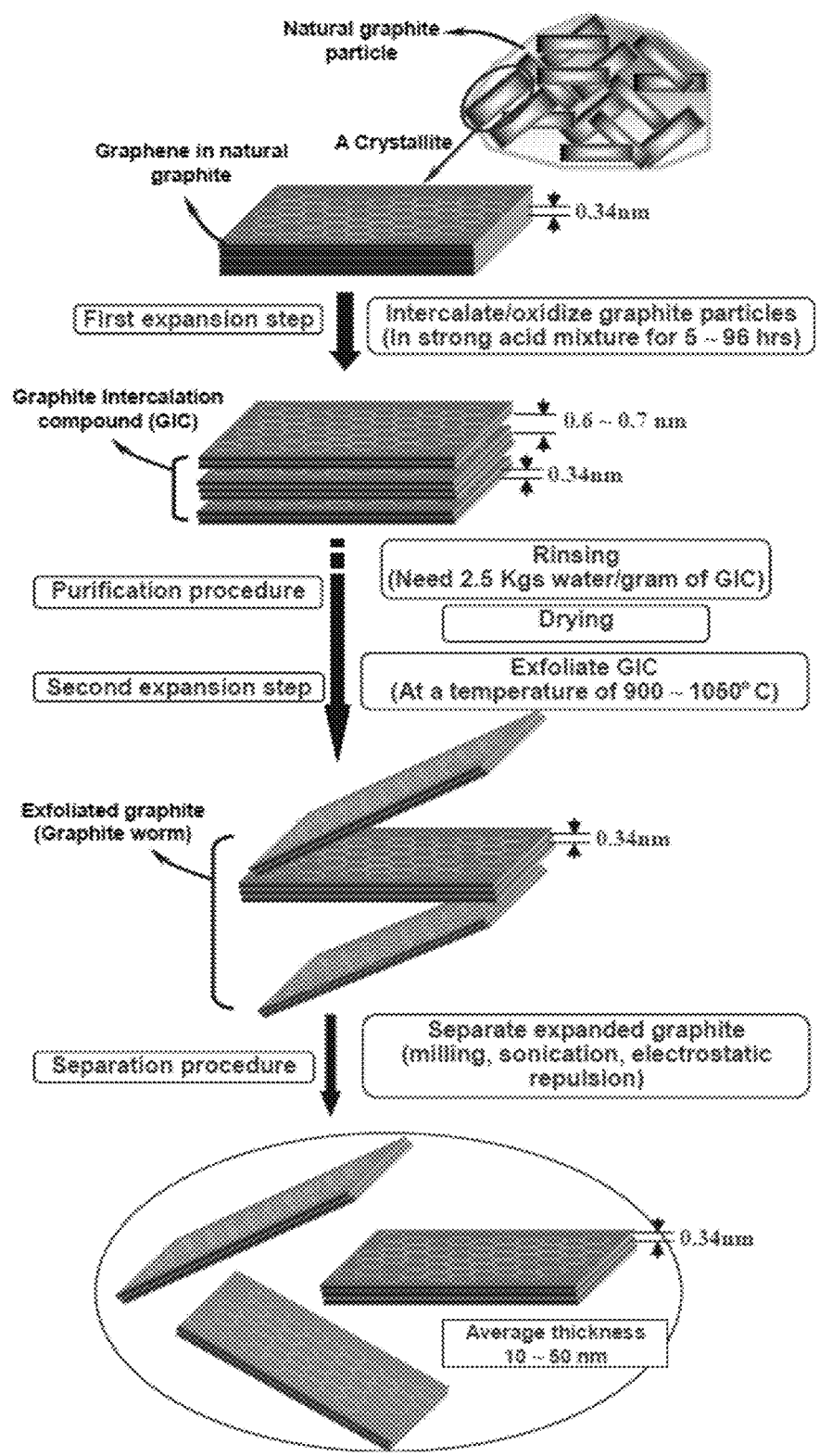
FIG. 1 A flow chart showing the most commonly used prior art process of producing highly oxidized NGPs that entails tedious chemical oxidation/intercalation, rinsing, and high-temperature exfoliation procedures.
Figure 2A:
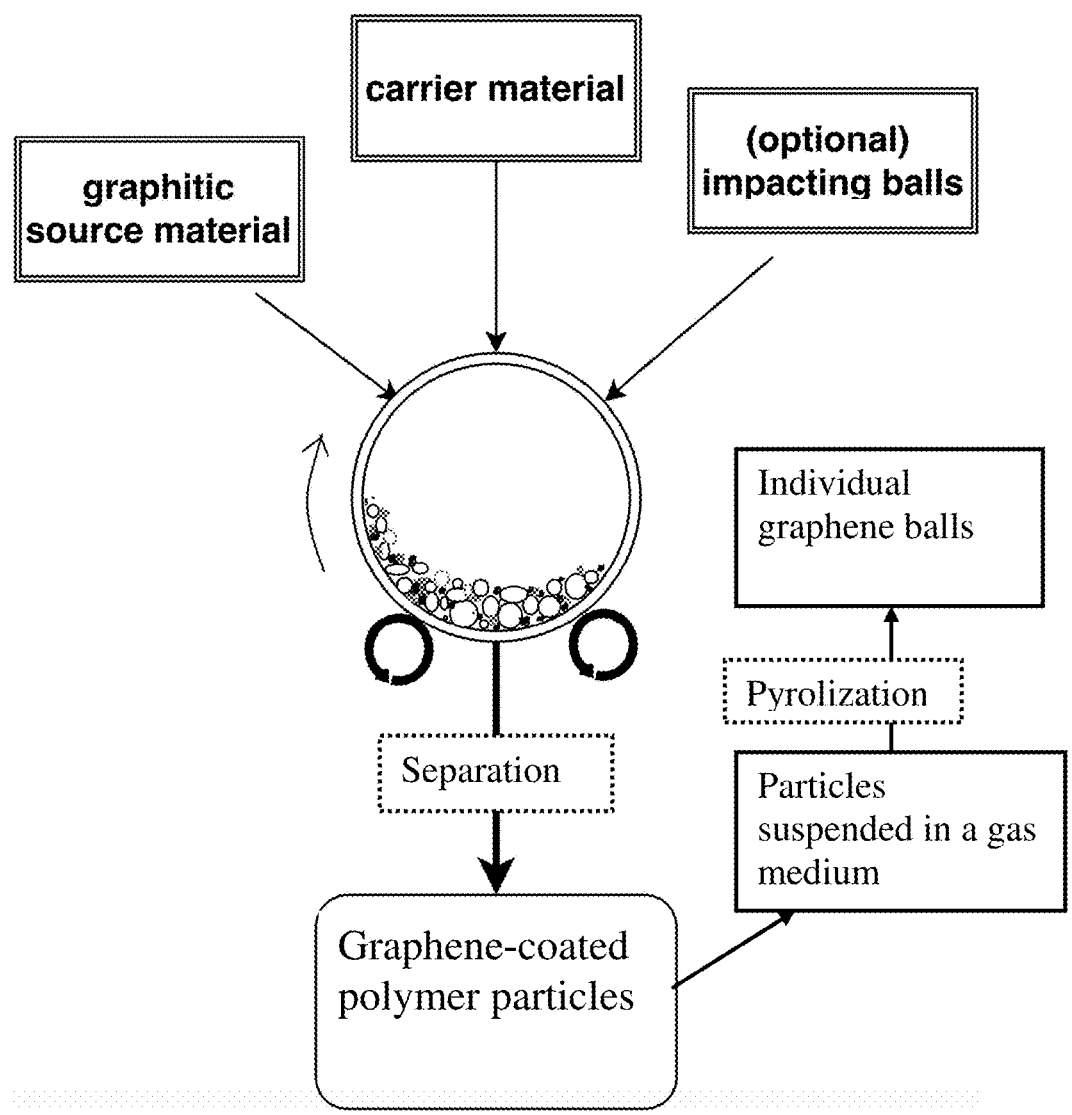
FIG. 2(A) A flow chart showing the presently invented process for producing graphene balls.

As schematically illustrated in FIG. 2(A), the method begins with mixing multiple particles of a graphitic material and multiple particles of a solid polymer carrier material to form a mixture, which is enclosed in an impacting chamber of an energy impacting apparatus (e.g. a vibratory ball mill, planetary ball mill, high energy mill, basket mill, agitator ball mill, cryo ball mill, micro ball mill, tumbler or tumbler ball mill, continuous ball mill, stirred ball mill, pressurized ball mill, freezer mill, vibratory sieve, bead mill, nanobead mill, ultrasonic homogenizer mill, centrifugal planetary mixer, vacuum ball mill, or resonant acoustic mixer). When in operation, this energy impacting device imparts kinetic energy to the solid particles contained therein, allowing polymer particles to impinge upon graphite particles with high intensity and high frequency.

In typical operational conditions, such impacting events result in peeling off of graphene sheets from the graphitic material and transferring the graphene sheets to surfaces of the solid polymer carrier particles. These graphene sheets wrap around polymer particles to form graphene-coated polymer particles inside the impacting chamber. This is herein referred to as the "direct transfer" process, meaning that graphene sheets are directly transferred from graphite particles to surfaces of polymer particles without being mediated by any third-party entities.

In certain alternative embodiments, a plurality of impacting balls or media can be added to the impacting chamber of the energy impacting apparatus. These impacting balls, accelerated by the impacting apparatus, impinge upon the surfaces/edges of graphite particles with a high kinetic energy at a favorable angle to peel off graphene sheets from graphite particles. These graphene sheets are tentatively transferred to surfaces of these impacting balls. These graphene-supporting impacting balls subsequently collide with polymer particles and transfer the supported graphene sheets to the surfaces of these polymer particles. This sequence of events is herein referred to as the "indirect transfer" process. These events occur in very high frequency and, hence, most of the polymer particles are covered by graphene sheets typically in less than one hour. In some embodiments of the indirect transfer process, step (c) includes operating a magnet to separate the impacting balls or media from the graphene-coated polymer particles.

The method then includes recovering the graphene-coated polymer particles from the impacting chamber. The graphene-coated polymer particles are then pyrolyzed to thermally convert the polymer into carbon or graphite that bonds the graphene sheets together while the particles are being suspended in a gaseous medium. A main purpose of suspending these graphene-coated polymer particles while being heat-treated is to keep individual particles separated so that the resulting hollow graphene balls are not aggregated and bonded together. A fluidized bed apparatus or a properly configured pattern of a gas stream can be used for this purpose.

For the formation of the carbon component of the resulting graphene balls containing a shell of carbon-bonded graphene sheets, one can choose polymer particles that have a high carbon yield or char yield (e.g. >30% by weight of a polymer being converted to a solid carbon phase; instead of becoming part of a volatile gas). The high carbon-yield polymer may be selected from phenolic resin, poly furfuryl alcohol, polyacrylonitrile, polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, a copolymer thereof, a polymer blend thereof, or a combination thereof. When pyrolyzed, particles of these polymers become porous, as illustrated in the bottom portion of FIG. 2(B).

If a lower carbon content (higher graphene proportion relative to carbon proportion) and lower foam density are desired in the graphene-carbon hybrid foam, the polymer can contain a low carbon-yield polymer selected from polyethylene, polypropylene, polybutylene, polyvinyl chloride, polycarbonate, acrylonitrile-butadiene (ABS), polyester, polyvinyl alcohol, poly vinylidiene fluoride (PVDF), polytetrafluoroethylene (PTFE), polyphenylene oxide (PPO), poly methyl methacrylate (PMMA), a copolymer thereof, a polymer blend thereof, or a combination thereof. When pyrolyzed, particles of these polymers become porous, as illustrated in the middle portion of FIG. 2(B).

These polymers (both high and low carbon yields), when heated at a temperature of 300-2,500° C., are converted into a carbon material, which is preferentially nucleated near graphene sheet edges. Such a carbon material naturally bridges the gaps between graphene sheets, forming interconnected electron-conducting pathways. In actuality, the resulting graphene-carbon hybrid shell is composed of integral 3D network of carbon-bonded graphene sheets, enabling continuous transport of electrons and phonons (quantized lattice vibrations) between graphene sheets or domains without interruptions. When further heated at a temperature higher than 2,500° C., the carbon phase can get graphitized to further increase both the electric conductivity and thermal conductivity. The amount of non-carbon elements is also decreased to typically below 1% by weight if the graphitization time exceeds 1 hour.

It may be noted that an organic polymer typically contains a significant amount of non-carbon elements, which can be reduced or eliminated via heat treatments. As such, pyrolyzation of a polymer causes the formation and evolution of volatile gas molecules, such as $CO_2$ and $H_2O$, which lead to the formation of pores in the resulting polymeric carbon phase. However, such pores also have a high tendency to get collapsed if the polymer is not constrained when being carbonized (the carbon structure can shrink while non-carbon elements are being released). We have surprising discovered that the graphene sheets wrapped around a polymer particle are capable of constraining the carbon pore walls from being collapsed. In the meantime, some carbon species also permeate to the gaps between graphene sheets where these species bond the graphene sheets together. The pore sizes and pore volume (porosity level) of the resulting graphene balls mainly depend upon the starting polymer size and the carbon yield of the polymer.

The graphitic material, as a source of graphene sheets, may be selected from natural graphite, synthetic graphite, highly oriented pyrolytic graphite, graphite fiber, graphitic nanofiber, graphite fluoride, oxidized graphite, chemically modified graphite, exfoliated graphite, recompressed exfoliated graphite, expanded graphite, mesocarbon microbead, or a combination thereof. In this regard, there are several additional surprising elements associated with the presently invented method:

(1) Graphene sheets can be peeled off from natural graphite by using polymer particles alone, without utilizing the heavier and harder impacting balls (such as zirconium dioxide or steel balls commonly used in a ball mill, for instance). The peeled-off graphene sheets are directly transferred to polymer particle surfaces and are firmly wrapped around the polymer particles.

(2) Impacting polymer particles are capable of peeling off graphene sheets from artificial graphite, such as mesocarbon microbeads (MCMBs), which are known to have a skin layer of amorphous carbon.

(3) With the assistance of harder impacting balls, the graphene-like planes of carbon atoms constituting the internal structure of a carbon or graphite fiber can also be peeled off and transferred to the polymer particle surfaces. This has never been taught or suggested in prior art.

(4) The present invention provides a strikingly simple, fast, scalable, environmentally benign, and cost-effective process that avoids essentially all of the drawbacks associated with prior art processes of producing graphene sheets. The graphene sheets are immediately transferred to and wrapped around the polymer particles, which are then readily converted to the integral graphene-carbon shell of the hollow graphene ball.

It may be noted that a certain desired degree of hydrophilicity can be imparted to the graphene-carbon hybrid shell if the starting graphite is intentionally oxidized to some degree (e.g. to contain 2-15% by weight of oxygen). Alternatively, one can attach oxygen-containing functional groups to the carbon phase if the carbonization treatment is allowed to occur in a slightly oxidizing environment. These features enable separation of oil from water by selectively absorbing oil from an oil-water mixture by a mass of hollow graphene balls. In other words, such graphene balls are capable of recovering oil from water, helping to clean up oil-spilled river, lake, or ocean. The oil absorption capacity is typically from 50% to 500% of the graphene ball's own weight. This is a wonderfully useful material for environmental protection purposes.

If a high electrical or thermal conductivity is desired, the graphitic material may be selected from a non-intercalated and non-oxidized graphitic material that has never been previously exposed to a chemical or oxidation treatment prior to being placed into the impacting chamber. Alternatively or additionally, the graphene balls can be subjected to a heat treatment at a temperature higher than 2,500° C. for graphitization of the carbon material converted from the polymer. The resulting material is particularly useful for thermal management applications (e.g. for use to make a finned heat sink, a heat exchanger, or a heat spreader).

X-ray diffraction patterns were obtained with an X-ray diffractometer equipped with CuKcv radiation. The shift and broadening of diffraction peaks were calibrated using a silicon powder standard. The degree of graphitization, g, was calculated from the X-ray pattern using the Mering's Eq, $d_{002}=0.3354 g+0.344 (1-g)$, where $d_{002}$ is the interlayer spacing of graphite or graphene crystal in nm. This equation is valid only when $d_{002}$ is equal or less than approximately 0.3440 nm. The graphene shells having a $d_{002}$ higher than 0.3440 nm reflects the presence of oxygen- or fluorine-containing functional groups (such as —F, —OH, >O, and —COOH on graphene molecular plane surfaces or edges) that act as a spacer to increase the inter-graphene spacing.

Another structural index that can be used to characterize the degree of ordering of the stacked and bonded graphene planes in the shell of graphene balls and conventional graphite crystals is the "mosaic spread," which is expressed by the full width at half maximum of a rocking curve (X-ray diffraction intensity) of the (002) or (004) reflection. This degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our graphene walls have a mosaic spread value in this range of 0.2-0.4 (if produced with a heat treatment temperature (HTT) no less than 2,500° C.). However, some values are in the range from 0.4-0.7 if the HTT is between 1,500 and 2,500° C., and in the range from 0.7-1.0 if the HTT is between 300 and 1,500° C.

In-depth studies using a combination of SEM, TEM, selected area diffraction, X-ray diffraction, AFM, Raman spectroscopy, and FTIR indicate that the graphene shells are composed of several huge graphene planes (with length/width typically >>20 nm, more typically >>100 nm, often >>1 µm, and, in many cases, >>10 µm, or even >>100 µm). These giant graphene planes are stacked and bonded along the thickness direction (crystallographic c-axis direction) often through not just the van der Waals forces (as in conventional graphite crystallites), but also covalent bonds, if the final heat treatment temperature is lower than 2,500° C. In these cases, wishing not to be limited by theory, but Raman and FTIR spectroscopy studies appear to indicate the co-existence of $sp^2$ (dominating) and $sp^3$ (weak but existing) electronic configurations, not just the conventional $sp^2$ in graphite.

The shell of the hollow graphene ball contains single-layer or few-layer graphene sheets chemically bonded by a carbon material having a carbon material-to-graphene weight ratio from 1/100 to 1/2, wherein the few-layer graphene sheets have 2-10 layers of stacked graphene planes having an inter-plane spacing $d_{002}$ from 0.3354 nm to 0.36 nm as measured by X-ray diffraction and the single-layer or few-layer graphene sheets contain a pristine graphene material having essentially zero % of non-carbon elements, or a non-pristine graphene material having 0.01% to 25% by weight of non-carbon elements (more typically <15%) wherein the non-pristine graphene is selected from graphene oxide, reduced graphene oxide, graphene fluoride, graphene chloride, graphene bromide, graphene iodide, hydrogenated graphene, nitrogenated graphene, chemically functionalized graphene, or a combination thereof.

The hollow graphene balls may have a density from 0.001 to 1.7 $g/cm^3$, a specific surface area from 50 to 3,000 $m^2/g$, a thermal conductivity of at least 200 W/mK per unit of specific gravity, and/or an electrical conductivity no less than 2,000 S/cm per unit of specific gravity. In a preferred embodiment, the shell contains stacked graphene planes having an inter-planar spacing $d_{002}$ from 0.3354 nm to 0.40 nm as measured by X-ray diffraction.

Thermal Management Applications

The aforementioned features and characteristics make the graphene balls an ideal element for a broad array of engineering and biomedical applications. For instance, for thermal management purposes alone, the graphene balls can be used in the following forms for various applications:

a) The graphene balls may be compacted together (with or without a binder resin) to become a compressible and elastic element of high thermal conductivity, which is ideally suited for use as a thermal interface material (TIM) that can be implemented between a heat source and a heat spreader or between a heat source and a heat sink.
b) The graphene balls can be filled into odd-shaped spaces as a heat spreader per se due to its high thermal conductivity.
c) The light weight (low density adjustable between 0.001 and 1.7 $g/cm^3$), high thermal conductivity per unit specific gravity or per unit of physical density, and high structural integrity (graphene sheets being bonded by carbon) make the graphene balls (coupling with a binder or matrix material) an ideal material for a durable heat exchanger. The matrix or binder material can be a polymer, a metal (e.g. Cu and Al), a pitch (e.g. petroleum pitch, coal tar pitch, mesophase pitch, etc.), glass, or ceramic (e.g. boron nitride).
d) The hollow graphene balls can be a thermally conductive additive of a conductive coating or paint formulation. The high thermal emissivity of the invented graphene balls enables good radiation-based heat dissipation. Furthermore, the substantially spherical shape of graphene balls can result in a heat-dissipator or heat sink surface having micro-grooves for micro-convective flow for faster heat dissipation.

The graphene ball-based thermal management or heat dissipating devices include a heat exchanger, a heat sink (e.g. finned heat sink), a heat pipe, high-conductivity insert, thin or thick conductive plate (between a heat sink and a heat source), thermal interface medium (or thermal interface material, TIM), thermoelectric or Peltier cooling plate, etc.

A heat exchanger is a device used to transfer heat between one or more fluids; e.g. a gas and a liquid separately flowing in different channels. The fluids are typically separated by a solid wall to prevent mixing. The presently invented graphene balls, along with a resin binder, may be sprayed over surfaces of a heat exchanger as a heat dissipation-enhancing coating, for instance.

Heat exchangers are widely used in refrigeration systems, air conditioning units, heaters, power stations, chemical plants, petrochemical plants, petroleum refineries, natural-gas processing, and sewage treatment. A well-known example of a heat exchanger is found in an internal combustion engine in which a circulating engine coolant flows through radiator coils while air flows past the coils, which cools the coolant and heats the incoming air. The solid walls (e.g. that constitute the radiator coils) are normally made of a high thermal conductivity material, such as Cu and Al. The presently invented graphene balls, having either a higher thermal conductivity or higher specific surface area, are a superior alternative to Cu and Al, for instance.

There are many types of heat exchangers that are commercially available: shell and tube heat exchanger, plate heat exchangers, plate and shell heat exchanger, adiabatic wheel heat exchanger, plate fin heat exchanger, pillow plate heat exchanger, fluid heat exchangers, waste heat recovery units, dynamic scraped surface heat exchanger, phase-change heat exchangers, direct contact heat exchangers, and microchannel heat exchangers. Every one of these types of heat exchangers can take advantage of the exceptional high thermal conductivity and specific surface area of the presently invented graphene ball material.

The presently invented solid graphene balls can also be used in a heat sink. Heat sinks are widely used in electronic devices for heat dissipation purposes. The central processing unit (CPU) and battery in a portable microelectronic device (such as a notebook computer, tablet, and smart phone) are well-known heat sources. Typically, a metal or graphite object (e.g. Cu foil or graphite foil) is brought into contact with the hot surface and this object helps to spread the heat to an external surface or outside air (primarily by conduction and convection and to a lesser extent by radiation). In most cases, a thin thermal interface material (TIM) mediates between the hot surface of the heat source and a heat spreader or a heat-spreading surface of a heat sink.

A heat sink usually consists of a high-conductivity material structure with one or more flat surfaces to ensure good thermal contact with the components to be cooled, and an array of comb or fin like protrusions to increase the surface contact with the air, and thus the rate of heat dissipation. A heat sink may be used in conjunction with a fan to increase the rate of airflow over the heat sink. A heat sink can have multiple fins (extended or protruded surfaces) to improve heat transfer. In electronic devices with limited amount of space, the shape/arrangement of fins must be optimized such that the heat transfer density is maximized. Alternatively or additionally, cavities (inverted fins) may be embedded in the regions formed between adjacent fins. These cavities are effective in extracting heat from a variety of heat generating bodies to a heat sink.

Typically, an integrated heat sink comprises a heat collection member (core or base) and at least one heat dissipation member (e.g. a fin or multiple fins) integral to the heat collection member (base) to form a finned heat sink. The fins and the core are naturally connected or integrated together into a unified body without using an externally applied adhesive or mechanical fastening means to connect the fins to the core. The heat collection base has a surface in thermal contact with a heat source (e.g. a LED), collects heat from this heat source, and dissipates heat through the fins into the air.

Figure 10:
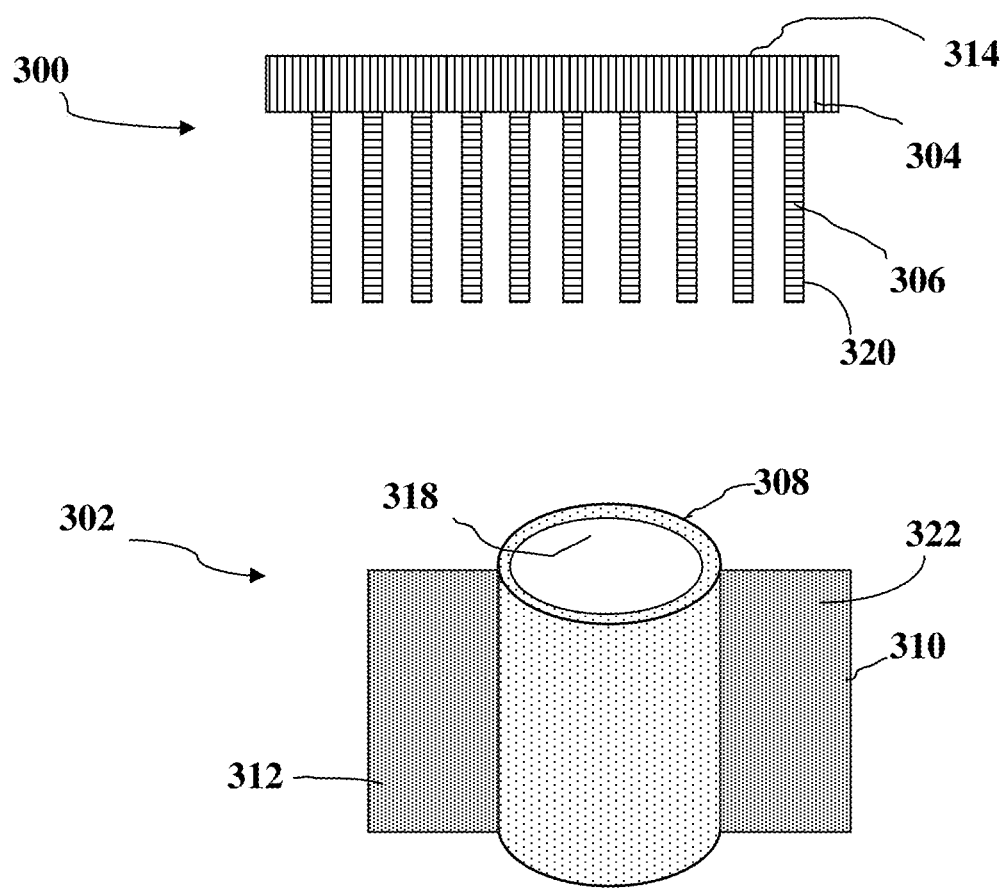
FIG. 10 Schematic of heat sink structures (2 examples).

As illustrative examples, FIG. 10 provides a schematic of two heat sinks: 300 and 302. The first one contains a heat collection member (or base member) 304 and multiple fins or heat dissipation members (e.g. fin 306) connected to the base member 304. The base member 304 is shown to have a heat collection surface 314 intended to be in thermal contact with a heat source. The heat dissipation member or fin 306 is shown to have at least a heat dissipation surface 320.

A particularly useful embodiment is an integrated radial heat sink 302 comprising a radial finned heat sink assembly that comprises: (a) a base 308 comprising a heat collection surface 318; and (b) a plurality of spaced parallel planar fin members (e.g. 310, 312 as two examples) supported by or integral with the base 308, wherein the planar fin members (e.g. 310) comprise the at least one heat dissipation surface 322. Multiple parallel planar fin members are preferably equally spaced.

The presently invented graphene balls can be an additive in the structure of any finned heat sink element, or simply an ingredient of a heat-dissipating coating of any element. The graphene balls, being highly elastic and resilient, are a good thermal interface material and a highly effective heat spreading element as well. In addition, these high-conductivity graphene balls can also be used as an insert for electronic cooling and for enhancing the heat removal from small chips to a heat sink. Because the space occupied by high conductivity materials is a major concern, it is a more efficient design to make use of high conductivity pathways that can be embedded into a heat generating body. The elastic and highly conducting graphene balls herein disclosed meets these requirements perfectly.

The high elasticity and high thermal conductivity make the presently invented solid graphene balls (made into a compact with or without a binder) a good conductive thick plate to be placed as a heat transfer interface between a heat source and a cold flowing fluid (or any other heat sink) to improve the cooling performance. In such an arrangement, the heat source is cooled under the thick graphene ball-based plate instead of being cooled in direct contact with the cooling fluid. The thick plate of graphene balls can significantly improve the heat transfer between the heat source and the cooling fluid by way of conducting the heat current in an optimal manner. No additional pumping power and no extra heat transfer surface area are required.

The graphene balls may also be coated onto selected surfaces of a heat pipe. In addition, graphene balls can be used as a wick material inside a heat pipe. A heat pipe is a heat transfer device that uses evaporation and condensation of a two-phase working fluid or coolant to transport large quantities of heat with a very small difference in temperature between the hot and cold interfaces. A conventional heat pipe consists of sealed hollow tube made of a thermally conductive metal such as Cu or Al, and a wick to return the working fluid from the evaporator to the condenser. The pipe contains both of the saturated liquid and vapor of a working fluid (such as water, methanol or ammonia), all other gases being excluded. However, both Cu and Al are prone to oxidation or corrosion and, hence, their performance degrades relatively fast over time. In contrast, the invented solid graphene balls are chemically inert and do not have these oxidation or corrosion issues. The heat pipe for electronics thermal management can have a solid graphene foam envelope and wick, with water as the working fluid. Graphene/methanol may be used if the heat pipe needs to operate below the freezing point of water, and graphene/ammonia heat pipes may be used for electronics cooling in space.

Peltier cooling plates operate on the Peltier effect to create a heat flux between the junction of two different conductors of electricity by applying an electric current. This effect is commonly used for cooling electronic components and small instruments. In practice, many such junctions may be arranged in series to increase the effect to the amount of heating or cooling required. The solid graphene balls may be used to improve the heat transfer efficiency.

Filtration and Fluid Absorption Applications

The graphene balls and a solid compact element containing graphene balls compacted together can contain microscopic pores (<2 nm) or mesoscaled pores having a pore size from 2 nm to 50 nm. They can also be made to contain micron-scaled pores (1-500 μm). Based on well-controlled pore size alone, the instant graphene ball products can be an exceptional filter material for air or water filtration.

Further, the graphene shell chemistry and the bonding carbon phase chemistry can be independently controlled to impart different amounts and/or types of functional groups to either or both of the graphene sheets and the carbon binder phase (e.g. as reflected by the percentage of O, F, N, H, etc. in the foam). In other words, the concurrent or independent control of both pore sizes and chemical functional groups at different sites of the internal structure provide unprecedented flexibility or highest degree of freedom in designing and making graphene balls (i.e. graphene/carbon hybrid balls) that exhibit many unexpected properties, synergistic effects, and some unique combination of properties that are normally considered mutually exclusive (e.g. some part of the structure is hydrophobic and other part hydrophilic; or the compact structure containing graphene balls can be both hydrophobic and oleophilic). A surface or a material is said to be hydrophobic if water is repelled from this material or surface and that a droplet of water placed on a hydrophobic surface or material will form a large contact angle. A surface or a material is said to be oleophilic if it has a strong affinity for oils and not for water. The present method allows for precise control over hydrophobicity, hydrophilicity, and oleophilicity of an object containing multiple types of graphene balls.

The present invention also provides an oil-removing, oil-separating, or oil-recovering device, which contains the presently invented graphene balls as an oil-absorbing or oil-separating element. Also provided is a solvent-removing or solvent-separating device containing the graphene balls as a solvent-absorbing element.

A major advantage of using the instant graphene-carbon hybrid balls as an oil-absorbing element is its structural integrity. Due to the notion that graphene sheets in the shell are chemically bonded by the carbon material, the resulting foam would not get disintegrated upon repeated oil absorption operations. In contrast, we have discovered that graphene-based oil-absorbing elements prepared by hydrothermal reduction, vacuum-assisted filtration, or freeze-drying get disintegrated after absorbing oil for 2 or 3 times. There is just nothing (other than weak van der Waals forces existing prior to first contact with oil) to hold these otherwise separated graphene sheets together. Once these graphene sheets are wetted by oil, they no longer are able to return to the original shape of the oil-absorbing element.

Another major advantage of the instant technology is the flexibility in designing and making oil-absorbing elements that are capable of absorbing oil up to an amount as high as 400 times of its own weight yet still maintaining its structural shape (without significant expansion). This amount depends upon the specific pore volume of the foam, which can be controlled mainly by the ratio between the amount of original carrier polymer particles and the amount of graphene sheets prior to the heat treatment.

The invention also provides a method to separate/recover oil from an oil-water mixture (e.g. oil-spilled water or waste water from oil sand). The method comprises the steps of (a) providing an oil-absorbing element comprising the invented graphene balls; (b) contacting an oil-water mixture with the element, which absorbs the oil from the mixture; and (c) retreating the oil-absorbing element from the mixture and extracting the oil from the element. Preferably, the method comprises a further step of (d) reusing the element.

Additionally, the invention provides a method to separate an organic solvent from a solvent-water mixture or from a multiple-solvent mixture. The method comprises the steps of (a) providing an organic solvent-absorbing element comprising multiple graphene balls, separately or bonded together; (b) bringing the element in contact with an organic solvent-water mixture or a multiple-solvent mixture containing a first solvent and at least a second solvent; (c) allowing this element to absorb the organic solvent from the mixture or absorb the first solvent from the at least second solvent; and (d) retreating the element from the mixture and extracting the organic solvent or first solvent from the element. Preferably, the method contains an additional step (e) of reusing the solvent-absorbing element.

The following examples are used to illustrate some specific details about the best modes of practicing the instant invention and should not be construed as limiting the scope of the invention.

Example 1: Production of Graphene Balls from Flake Graphite Via Polypropylene Powder-Based Solid Polymer Carrier In an experiment, 1 kg of polypropylene (PP) pellets, 50 grams of flake graphite, 50 mesh (average particle size 0.18 mm; Asbury Carbons, Asbury N.J.) and 250 grams of magnetic steel balls were placed in a high-energy ball mill container. The ball mill was operated at 300 rpm for 2 hours. The container lid was removed and stainless steel balls were removed via a magnet. The polymer carrier material was found to be coated with a dark graphene layer. Carrier material was placed over a 50 mesh sieve and a small amount of unprocessed flake graphite was removed.

A sample of the coated carrier material was then submitted to air flow suspension in a heating chamber, wherein the graphene-coated PP particles were heat-treated at 350° C. and then at 600° C. for 2 hours to produce individual (isolated/separated) graphene balls.

In a separate experiment, the same batch of PP pellets and flake graphite particles (without the impacting steel balls) were placed in the same high-energy ball mill container and the ball mill was operated under the same conditions for the same period of time. The results were compared with those obtained from impacting ball-assisted operation. The graphene sheets isolated from PP particles, upon PP dissolution, are mostly single-layer graphene. The graphene balls produced from this process typically have a higher level of porosity (lower physical density).

Although polypropylene (PP) is herein used as an example, the carrier material for graphene ball production is not limited to PP. It could be any polymer (thermoplastic, thermoset, rubber, wax, mastic, gum, organic resin, etc.) provided the polymer can be made into a particulate form. It may be noted that un-cured or partially cured thermosetting resins (such as epoxide and imide-based oligomers or rubber) can be made into a particle form at room temperature or lower (e.g. cryogenic temperature). Hence, even partially cured thermosetting resin particles can be used as a polymer carrier.

Example 2: Graphene Balls Using Expanded Graphite (>100 nm in Thickness) as the Graphene Source and ABS as the Polymer Solid Carrier Particles In an experiment, 100 grams of ABS pellets, as solid carrier material particles, were placed in a 16 oz plastic container along with 5 grams of expanded graphite. This container was placed in an acoustic mixing unit (Resodyn Acoustic mixer) and processed for 30 minutes. After processing, carrier material was found to be coated with a thin layer of carbon. A small sample of carrier material was placed in acetone and subjected to ultrasound energy to speed dissolution of the ABS. The solution was filtered using an appropriate filter and washed four times with additional acetone. Subsequent to washing, filtrate was dried in a vacuum oven set at 60° C. for 2 hours. This sample was examined by optical microscopy and found to be graphene. The remaining pellets were suspended in a fluidized bed apparatus while being carbonized to prepare graphene balls under different temperature and time conditions (e.g. 300-1,500° C. for 0.5-5 hours).

Example 3: Production of Graphene Balls from Mesocarbon Microbeads (MCMBs as the Graphene Source Material) and Polyacrylonitrile (PAN) Fibers (as Solid Carrier Particles)

In one example, 100 grams of PAN fiber segments (0.2-2 mm long as the carrier particles), 5 grams of MCMBs (China Steel Chemical Co., Taiwan), and 50 grams of zirconia beads were placed in a vibratory ball mill and processed for 2 hours. After the process was completed, the vibratory mill was then opened and the carrier material was found to be coated with a dark coating of graphene sheets. The zirconia particles, having distinctly different sizes and colors were manually removed. The graphene-coated PAN fibers were then subjected to a heat treatment at 250° C. for 1 hour (in an air stream), 350° C. for 2 hours, and 1,000° C. for 2 hours (under a flowing argon gas stream) to obtain multiple isolated graphene balls. Half of the carbonized graphene balls were then further heated to 2,850° C. and maintained at this temperature for 0.5 hours.

Example 4: Particles of Cured Phenolic Resin as the Polymer Carrier in a Freezer Mill In one experiment, 10 grams of phenolic resin particles were placed in a SPEX mill sample holder (SPEX Sample Prep, Metuchen, N.J.) along with 0.25 grams of artificial graphite powder and a magnetic stainless steel impactor. The same experiment was performed, but the sample holder did not contain any impactor balls. These processes were carried out in a 1%-humidity "dry room" to reduce the condensation of water onto the completed product. The SPEX mill was operated for 10-120 minutes. After operation, the contents of the sample holder were sorted to recover graphene-coated resin particles by removing residual graphite powder and impactor balls (when used).

The resulting graphene-coated resin particles in both cases (with or without impactor balls) were examined using both digital optical microscopy and scanning electron microscopy (SEM). It was observed that the thickness of the graphene sheets wrapped around resin particles increases with the milling operation time and, given the same duration of operation, the impactor-assisted operation leads to thicker graphene coating.

A mass of graphene-coated resin particles was subjected to air stream-assisted pyrolyzation to produce graphene balls.

Example 5: Natural Graphite Particles as the Graphene Source, Polyethylene (PE) or Nylon 6/6 Beads as the Solid Carrier Particles, and Ceramic or Glass Beads as Added Impacting Balls In an experiment, 0.5 kg of PE or nylon beads (as a solid carrier material), 50 grams of natural graphite (source of graphene sheets) and 250 grams of zirconia powder (impacting balls) were placed in containers of a planetary ball mill. The ball mill was operated at 300 rpm for 4 hours. The container lid was removed and zirconia beads (different sizes and weights than graphene-coated PE beads) were removed through a vibratory screen. The polymer carrier material particles were found to be coated with a dark graphene layer. Carrier material was placed over a 50 mesh sieve and a small amount of unprocessed flake graphite was removed. In a separate experiment, glass beads were used as the impacting balls; other ball-milling operation conditions remained the same.

Figure 2B:
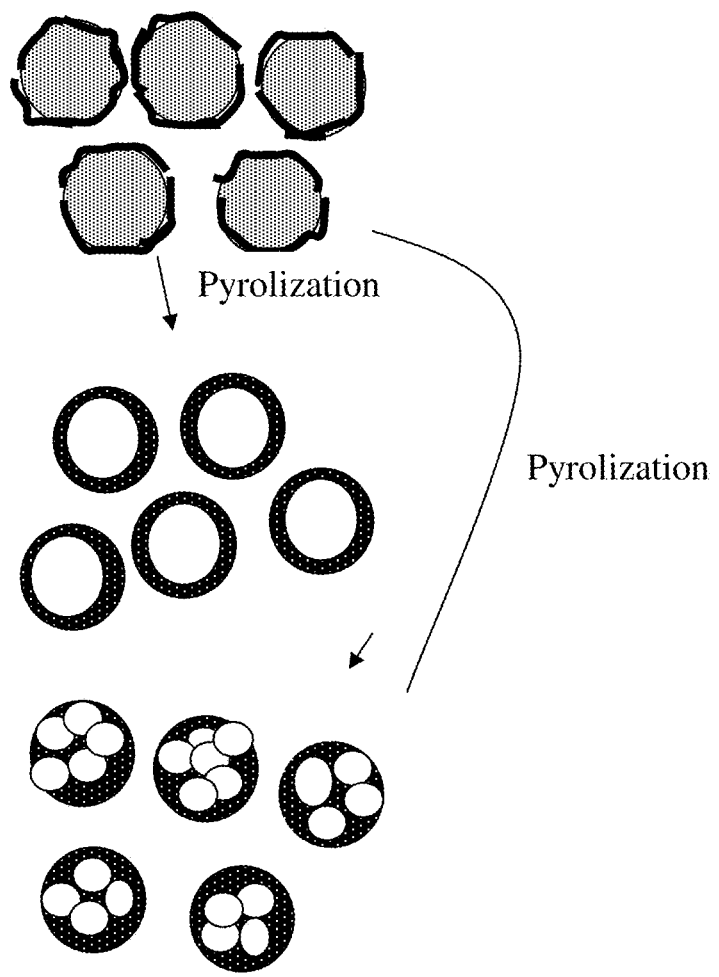
FIG. 2(B) Schematic of the heat-induced conversion of polymer into carbon, which bonds graphene sheets together to form separated, individual graphene balls.

A mass of graphene-coated PE pellets and a mass of graphene-coated nylon beads were separately subjected to pyrolyzation (by heating the compacts in a chamber from 100° C. to 650° C.) while being suspended in a nitrogen gas stream for producing graphene balls. SEM examination of these structures indicates that carbon phases are present near the edges of graphene sheets and these carbon phases act to bond the graphene sheets together. The carbon-bonded graphene sheets form a shell of a graphene ball. Graphene balls are schematically illustrated in FIG. 2(B).

Example 6: Micron-Sized Rubber Particles as the Solid Polymer Carrier Particles

The experiment began with preparation of micron-sized rubber particles. A mixture of methylhydro dimethyl-siloxane polymer (20 g) and polydimethylsiloxane, vinyldimethyl terminated polymer (30 g) was obtained by using a homogenizer under ambient conditions for 1 minute. Tween 80 (4.6 g) was added and the mixture was homogenized for 20 seconds. Platinum-divinyl-tetramethyl-disiloxane complex (0.5 g in 15 g methanol) was added and mixed for 10 seconds. This mixture was added to 350 g of distilled water and a stable latex was obtained by homogenization for 15 minutes. The latex was heated to 60° C. for 15 hours. The latex was then de-emulsified with anhydrous sodium sulfate (20 g) and the silicone rubber particles were obtained by filtration under a vacuum, washing with distilled water, and drying under vacuum at 25° C. The particle size distribution of the resulting rubber particles as 3-11 µm.

In one example, 10 grams of rubber particles, 2 grams of natural graphite, and 5 grams of zirconia beads were placed in a vibratory ball mill and processed for 2 hours. After the process was completed, the vibratory mill was then opened and the rubber particles were found to be coated with a dark coating of graphene sheets. The zirconia particles were manually removed. The graphene-coated rubber particles were then subjected to a heat treatment at 350° C. for 1 hour, 650° C. for 2 hours, and 1,000° C. for 1 hour in a fluidized bed furnace to obtain graphene balls.

Example 7: Preparation of Graphene Fluoride Balls

In a typical procedure, a powder mass of graphene balls was fluorinated by vapors of chlorine trifluoride in a sealed autoclave reactor to yield fluorinated graphene balls. Different durations of fluorination time were allowed for achieving different degrees of fluorination.

Figure 9:
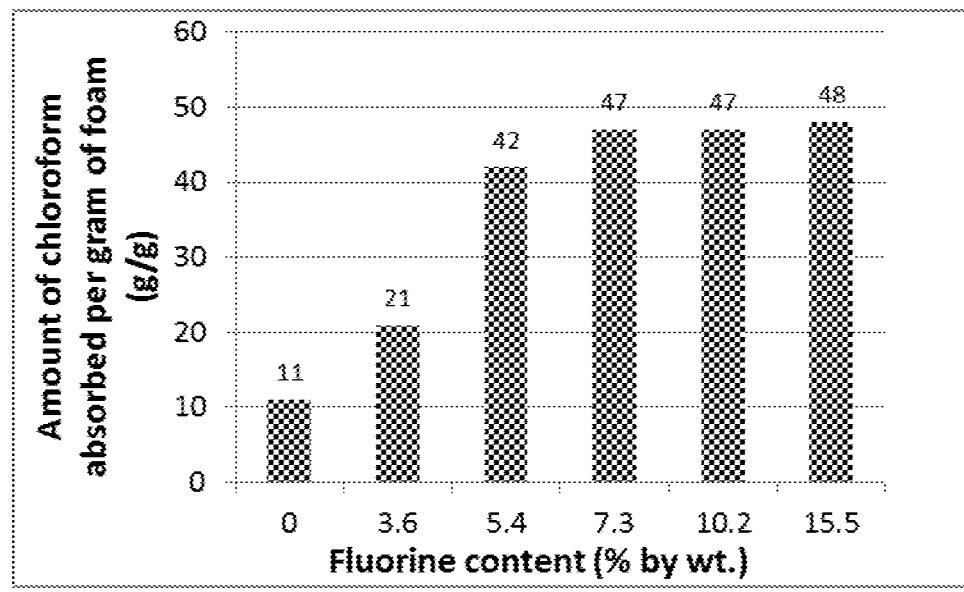
FIG. 9 The amount of chloroform absorbed out of a chloroform-water mixture, plotted as a function of the degree of fluorination.

Multiple fluorinated graphene balls were compacted with a resin binder into sheets of fluorinated graphene balls, which were then separately immersed in containers each containing a chloroform-water mixture. We observed that these compacted fluorinated graphene ball sheets selectively absorb chloroform from water and the amount of chloroform absorbed increases with the degree of fluorination until the fluorine content reaches 7.1% by wt. (FIG. 9)

Example 8: Preparation of Graphene Oxide Balls and Nitrogenataed Graphene Balls

Several samples of compacted graphene balls were immersed in a 30% $H_2O_2$-water solution for a period of 2-48 hours to obtain graphene oxide (GO) balls, having an oxygen content of 2-25% by weight.

Some GO ball samples were mixed with different proportions of urea and the mixtures were heated in a microwave reactor (900 W) for 0.5 to 5 minutes. The products were washed several times with deionized water and vacuum dried. The products obtained were nitrogenated graphene balls. The nitrogen contents were from 3% to 17 wt. %, as measured by elemental analysis.

Figure 7:
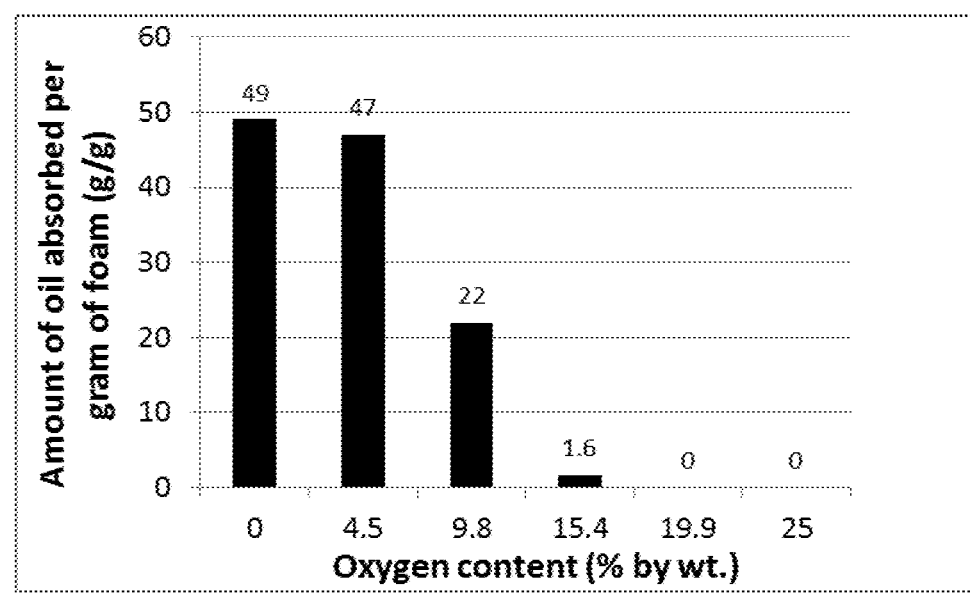
FIG. 7 The amount of oil absorbed per gram of graphene ball compacts, plotted as a function of the oxygen content in the foam having a porosity level of approximately 97% (oil separation from oil-water mixture).
Figure 8:
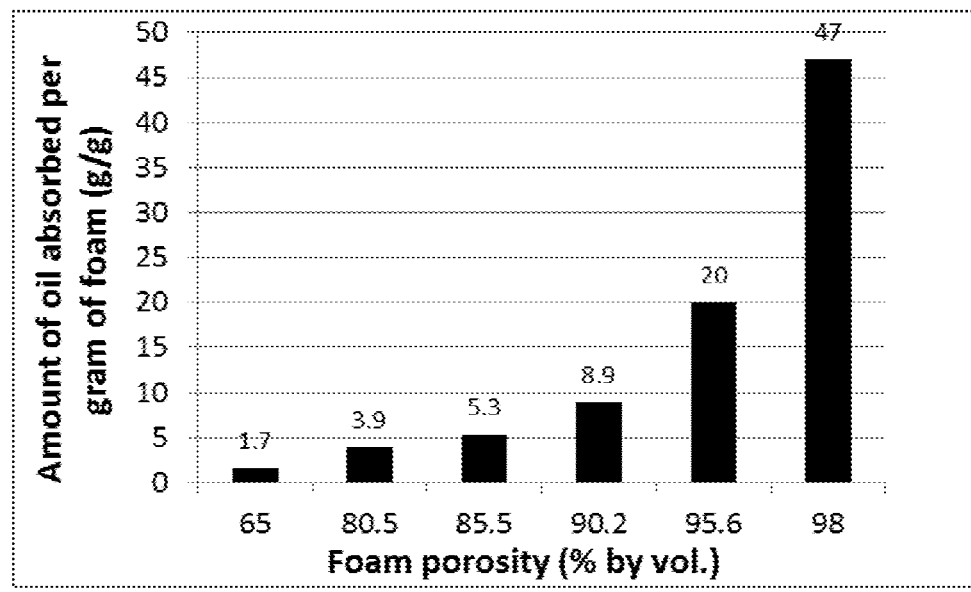
FIG. 8 The amount of oil absorbed per gram of integral carbon-bonded graphene ball compacts, plotted as a function of the porosity level (given the same oxygen content).

It may be noted that different functionalization treatments of the graphene balls were for different purposes. For instance, oxidized graphene-carbon balls are particularly effective as an absorber of oil from an oil-water mixture (i.e. oil spilled on water and then mixed together). In this case, the compacted graphene balls (0-15% by wt. oxygen), having graphene sheets bonded by carbon in the shell, are both hydrophobic and oleophilic (FIG. 7). A surface or a material is said to be hydrophobic if water is repelled from this material or surface and that a droplet of water placed on a hydrophobic surface or material will form a large contact angle. A surface or a material is said to be oleophilic if it has a strong affinity for oils and not for water.

Different contents of O, F, and/or N also enable the presently invented graphene balls to absorb different organic solvents from water, or to separate one organic solvent from a mixture of multiple solvents.

Example 9: Thermal and Mechanical Testing of Various Graphene Foams and Conventional Graphite Foam Samples from various conventional carbon or graphene foam materials were machined into specimens for measuring the thermal conductivity. The bulk thermal conductivity of mesophase pitch-derived foam ranged from 67 W/mK to 151 W/mK. The density of the samples was from 0.31-0.61 g/cm$^3$. When weight is taken into account, the specific thermal conductivity of the pitch derived foam is approximately 67/0.31=216 and 151/0.61=247.5 W/mK per specific gravity (or per physical density).

The compression strength of the samples having an average density of 0.51 g/cm$^3$ was measured to be 3.6 MPa and the compression modulus was measured to be 74 MPa. By contrast, the compression strength and compressive modulus of the presently invented graphene ball compact bonded by a phenolic resin having a comparable physical density are 5.5 MPa and 95 MPa, respectively.

Figure 3:
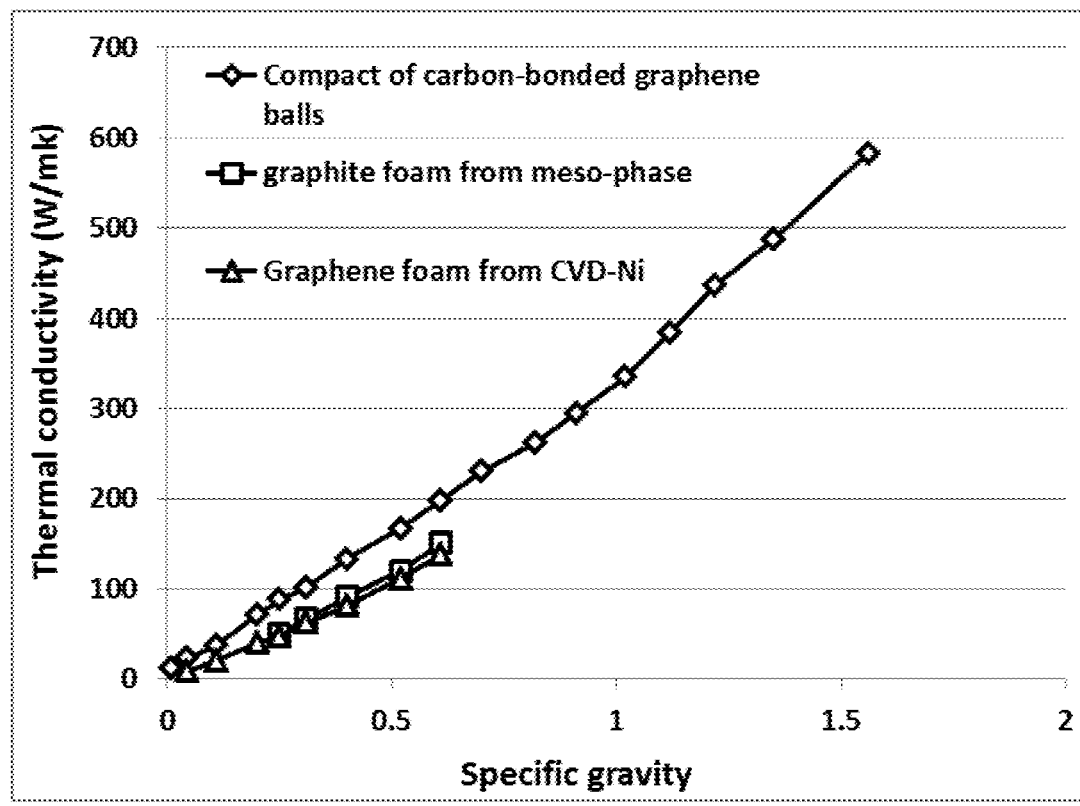
FIG. 3 Thermal conductivity values vs. specific gravity of a carbon-bonded graphene ball compact (a foam-like structure) produced by the presently invented process, a mesophase pitch-derived graphite foam, and a Ni foam-template assisted CVD graphene foam.
Figure 4:
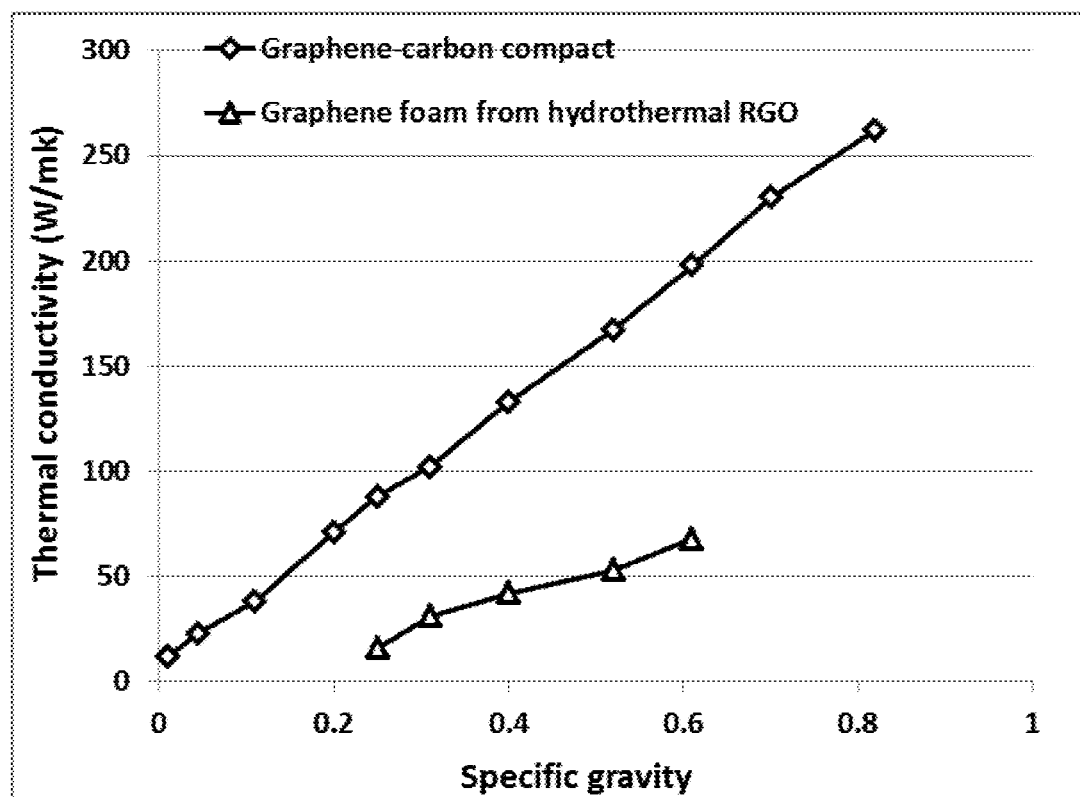
FIG. 4 Thermal conductivity values of carbon-bonded graphene ball compacts and the hydrothermally reduced GO graphene foam.
Figure 5:
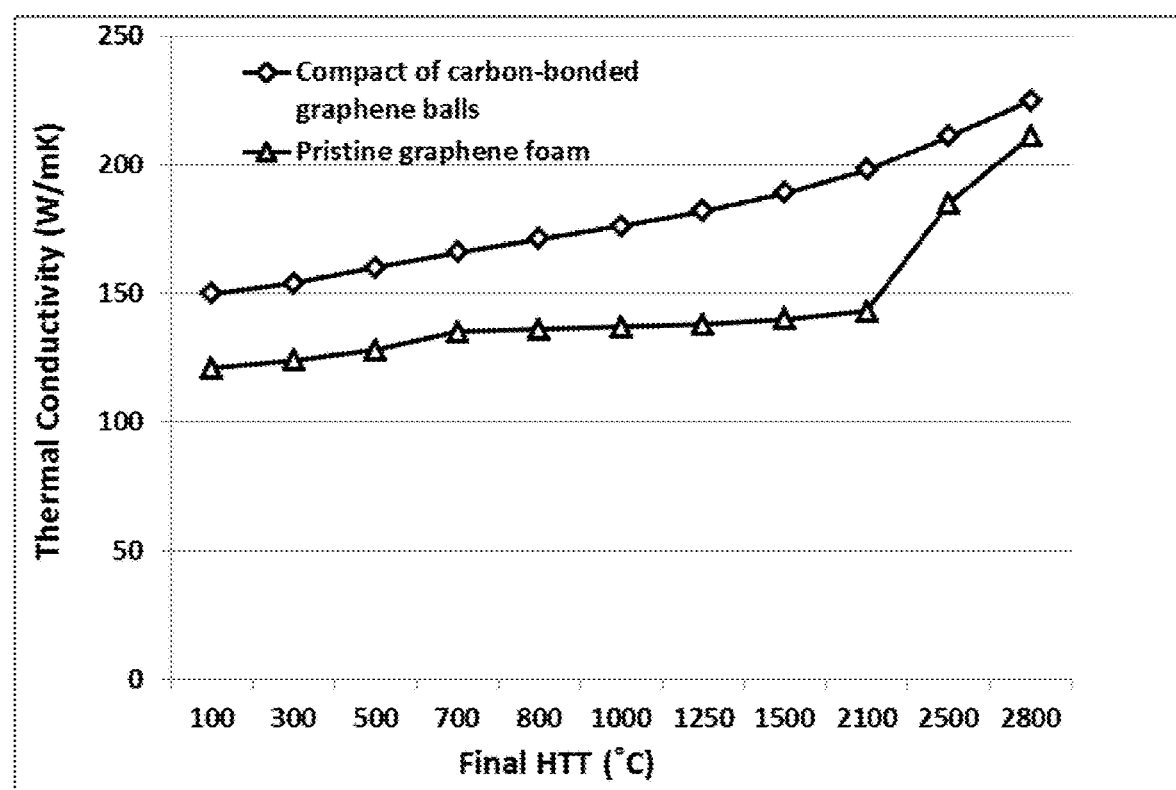
FIG. 5 Thermal conductivity values of carbon-bonded graphene ball compacts and pristine graphene foam (prepared by casting with a blowing agent and then heat treating) plotted as a function of the final (maximum) heat treatment temperature.
Figure 6:
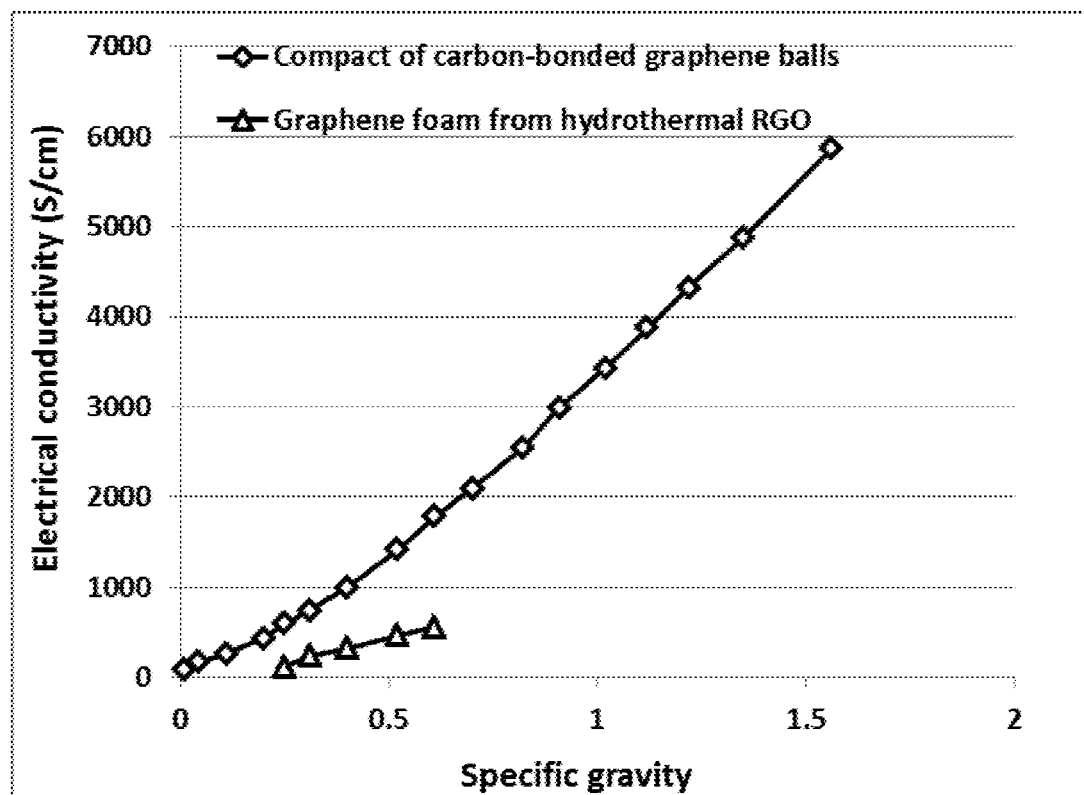
FIG. 6 Electrical conductivity values of carbon-bonded graphene ball compacts and the hydrothermally reduced GO graphene foam.

Shown in FIG. 3 are the thermal conductivity values vs. specific gravity of the graphene ball compact (bonded by carbonized phenolic resin), mesophase pitch-derived graphite foam, and Ni foam template-assisted CVD graphene foam. These data clearly demonstrate the following unexpected results:
1) The graphene ball compacts produced by the presently invented process exhibit significantly higher thermal conductivity as compared to both mesophase pitch-derived graphite foam and Ni foam template-assisted CVD graphene, given the same physical density.
2) This is quite surprising in view of the notion that CVD graphene is essentially pristine graphene that has never been exposed to oxidation and should have exhibited a high thermal conductivity compared to our graphene ball compacts. The carbon phase of the hybrid shell is in general of low degree of crystallinity (some being amorphous carbon) and, thus, has much lower thermal or electrical conductivity as compared with graphene alone. However, when the carbon phase is coupled with graphene sheets to form a graphene ball compact produced by the presently invented method, the resulting product exhibits a higher thermal conductivity as compared to an all-pristine graphene foam. These exceptionally high thermal conductivity values observed with the graphene ball compacts herein produced are much to our surprise. This is likely due to the observation that the otherwise isolated graphene sheets are now bonded by a carbon phase, providing a bridge for the uninterrupted transport of electrons and phonons.
3) The specific thermal conductivity values of the presently invented carbon-bonded graphene balls (the ball containing a shell of graphene sheets bonded by carbon) exhibit values from 250 to 500 W/mK per unit of specific gravity; but those of other types of foam materials are typically lower than 250 W/mK per unit of specific gravity.
4) Summarized in FIG. 5 are thermal conductivity data for a series of graphene ball compacts and a series of pristine graphene derived foams, both plotted over the final (maximum) heat treatment temperatures. In both types of materials, the thermal conductivity increases monotonically with the final HTT. However, the presently invented process enables the cost-effective and environmentally benign production of graphene-carbon foams that outperform pristine graphene foams. This is another unexpected result.
5) FIG. 4 shows the thermal conductivity values of the presently invented graphene foam compact and hydrothermally reduced GO graphene foam. Electrical conductivity values of graphene foam compacts and the hydrothermally reduced GO graphene foam are shown in FIG. 6. These data further support the notion that, given the same amount of solid material, the presently invented graphene ball compact is intrinsically most conducting, reflecting the significance of continuity in electron and phonon transport paths. The carbon phase bridges the gaps or interruptions between graphene sheets.

Example 10: Characterization of Various Graphene Ball Compacts, Graphene Foams and Conventional Graphite Foam The internal structures (crystal structure and orientation) of several series of graphene-carbon foam materials were investigated using X-ray diffraction. The X-ray diffraction curve of natural graphite typically exhibits a peak at approximately $2\theta=26°$, corresponds to an inter-graphene spacing ($d_{002}$) of approximately 0.3345 nm. The graphene walls of the hybrid foam materials exhibit a $d_{002}$ spacing typically from 0.3345 nm to 0.40 nm, but more typically up to 0.34 nm.

With a heat treatment temperature of 2,750° C. for the foam structure under compression for one hour, the $d_{002}$ spacing is decreased to approximately to 0.3354 nm, identical to that of a graphite single crystal. In addition, a second diffraction peak with a high intensity appears at $2\theta=55°$ corresponding to X-ray diffraction from (004) plane. The (004) peak intensity relative to the (002) intensity on the same diffraction curve, or the I(004)/I(002) ratio, is a good indication of the degree of crystal perfection and preferred orientation of graphene planes. The (004) peak is either non-existing or relatively weak, with the I(004)/I(002) ratio <0.1, for all graphitic materials heat treated at a temperature lower than 2,800° C. The I(004)/I(002) ratio for the graphitic materials heat treated at 3,000-3,250° C. (e.g., highly oriented pyrolytic graphite, HOPG) is in the range from 0.2-0.5. In contrast, a graphene foam prepared with a final HTT of 2,750° C. for one hour exhibits a I(004)/I(002) ratio of 0.78 and a Mosaic spread value of 0.21, indicating the pore walls being a practically perfect graphene single crystal with a good degree of preferred orientation (if prepared under a compression force).

The "mosaic spread" value is obtained from the full width at half maximum of the (002) reflection in an X-ray diffraction intensity curve. This index for the degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Some of our graphene foams have a mosaic spread value in this range of 0.3-0.6 when produced using a final heat treatment temperature no less than 2,500° C.

The following are a summary of some of the more significant results:

1) In general, the addition of impacting balls helps to accelerate the process of peeling off graphene sheets from graphite particles. However, this option necessitates the separation of these impacting balls after graphene-coated polymer particles are made.
2) When no impacting balls (e.g. ceramic, glass, metal balls, etc.) are used, harder polymer particles (e.g. PE, PP, nylon, ABS, polystyrene, high impact polystyrene, etc. and their filler-reinforced versions) are more capable of peeling off graphene sheets from graphite particles, as compared to softer polymer particles (e.g. rubber, PVC, polyvinyl alcohol, latex particles).
3) Without externally added impacting balls, softer polymer particles tend to result in graphene-coated particles having 0.001% to 5% by weight of graphene (mostly single-layer graphene sheets) and harder polymer particles tend to lead to graphene-coated particles having 0.01% to 30% by weight of graphene (mostly single-layer and few layer graphene sheets), given the same 1 hour of operating time.
4) With externally added impacting balls, polymer particles are generally capable of supporting from 0.001% to approximately 80% by weight of graphene sheets (mostly few-layer graphene, <10 layers, if over 30% by weight of graphene sheets).
5) The presently invented graphene ball compact (graphene balls bonded by carbon) typically exhibit significantly higher structural integrity (e.g. compression strength, elasticity, and resiliency) and higher thermal and electrical conductivities as compared to their counterparts produced by the conventional, prior art methods.
6) Many prior art processes for producing graphite foams or graphene foams appear to provide only macro-porous foams having a physical density in the range from approximately 0.2-0.6 g/cm$^3$, with pore sizes being typically too large (e.g. from 20 to 300 μm) for most of the intended applications. In contrast, the instant invention provides processes that generate graphene ball compacts having a density that can be as low as 0.001 g/cm$^3$ and as high as 1.7 g/cm$^3$. The pore sizes can be varied from microscopic (<2 nm), through mesoscaled (2-50 nm), and up to macro-scaled (e.g. from 1 to 500 μm). This level of flexibility and versatility in designing various types of graphene ball compacts is unprecedented and un-matched by any prior art process.
7) The presently invented method also allows for convenient and flexible control over the chemical composition (e.g. F, O, and N contents, etc.), responsive to various application needs (e.g. oil recovery from oil-contaminated water, separation of an organic solvent from water or other solvents, heat dissipation, etc.).

In conclusion, we have successfully developed highly conducting graphene balls, graphene ball compacts, devices, and related processes of production. The chemical composition (% of oxygen, fluorine, and other non-carbon elements), structure (crystal perfection, grain size, defect population, pore size, shell size, etc.), crystal orientation, morphology, process of production, and properties of this new class of porous materials are fundamentally different and patently distinct from mesophase pitch-derived graphite foam, CVD graphene-derived foam, and graphene foams from hydrothermal reduction of GO.

We claim:

1. A powder mass of multiple individual hollow graphene balls, wherein at least one of said hollow graphene balls has a graphene shell composed of graphene sheets bonded by a carbon material and a hollow core enclosed by said graphene shell, wherein said multiple individual hollow graphene balls are distinct from each other and not part of a foam.

2. The powder mass of claim 1, wherein said graphene shell comprises single-layer or few-layer graphene sheets chemically bonded by a carbon material having a carbon material-to-graphene weight ratio from 1/200 to 1/2.

3. The powder mass of claim 1, wherein said graphene shell comprises few-layer graphene sheets comprising 2-10 layers of stacked graphene planes having an inter-plane spacing $d_{002}$ from 0.3354 nm to 0.36 nm as measured by X-ray diffraction.

4. The powder mass of claim 1, wherein said hollow graphene balls have a density from 0.01 to 1.7 g/cm$^3$, and a specific surface area from 50 to 3,000 m$^2$/g.

5. The powder mass of claim 1, wherein said hollow graphene balls have a specific surface area from 50 to 3,000 m$^2$/g.

6. An oil-removing or oil-separating device containing said hollow graphene balls of claim 1 as an oil-absorbing element.

7. A solvent-removing or solvent-separating device containing said hollow graphene balls of claim 1 as a solvent-absorbing or solvent-separating element.

8. A thermal management device comprising said hollow graphene balls of claim 1 as a heat-conducting, heat spreading or heat dissipating element.

9. The thermal management device of claim 8, which comprises a device selected from a heat exchanger, heat sink, heat pipe, high-conductivity insert, conductive plate between a heat sink and a heat source, heat-spreading component, heat-dissipating component, thermal interface medium, or thermoelectric or Peltier cooling device.

10. The powder mass of claim 1, further including a binder resin that binds together the multiple individual hollow graphene balls.

* * * * *